United States Patent [19]

Banach

[11] 4,184,718
[45] Jan. 22, 1980

[54] TOOL SLIDE APPARATUS

[76] Inventor: Lester G. Banach, 10515 Hillcrest Dr., Palos Park, Ill. 60464

[21] Appl. No.: 905,431

[22] Filed: May 12, 1978

[51] Int. Cl.² ............................................. F16C 29/04
[52] U.S. Cl. .................................................. 308/3 A
[58] Field of Search ............... 308/3 A, 3 R, 3.5, 5 R, 308/DIG. 1

[56] References Cited
U.S. PATENT DOCUMENTS

| 3,787,132 | 1/1974 | Garnett | 308/3 A X |
| 3,813,132 | 5/1974 | Sahm | 308/3 A |
| 3,832,019 | 8/1974 | Alessi | 308/3 A |
| 3,994,539 | 11/1976 | Gottlieb | 308/3 A |

Primary Examiner—Douglas C. Butler
Attorney, Agent, or Firm—Richard L. Johnston

[57] ABSTRACT

A slide apparatus for feeding a tool or other element in one direction in a straight line at a controlled rate for a predetermined distance is provided characterized by a base having top, side, bottom and opposing end outer surfaces with tubular internal piston bores in opposing ends of the base, one bore being larger than the other, and each bore containing a sealed piston disposed for reciprocation, together with connections for controlling the movement of the pistons by fluid pressure, and a frame having a top and opposing ends extending downwardly from the top, which is adapted to carry a tool or other device to be fed, the opposing ends of the frame being rigidly connected by rods slidingly mounted in tubular passageways in the base and the inner sides of the ends of the frame being operably contacted by the pistons whereby the frame is moved in one direction in a straight line at a controlled rate in response to the movement of the pistons.

11 Claims, 6 Drawing Figures

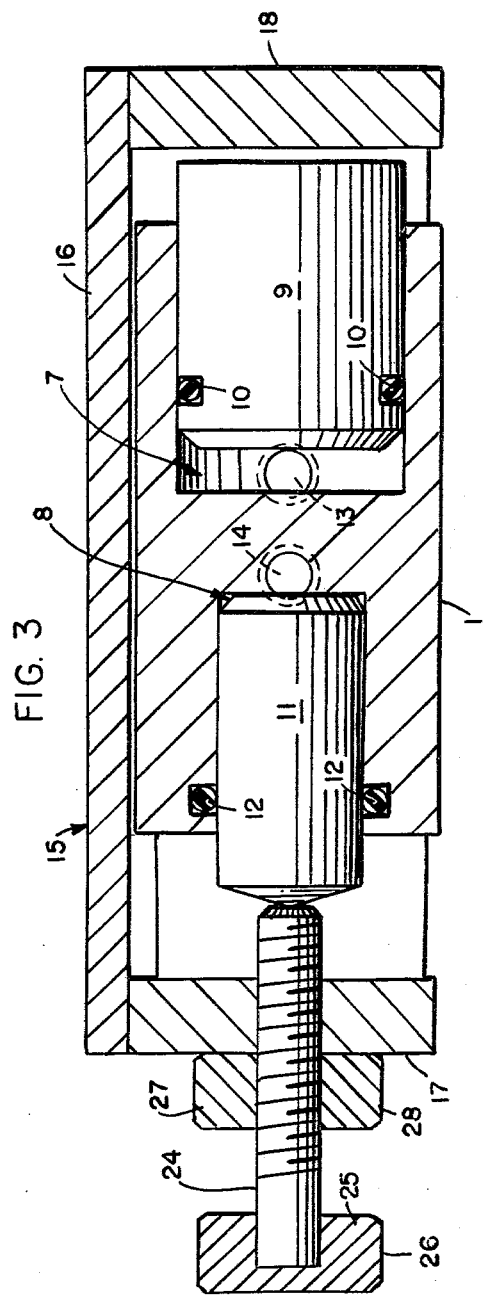
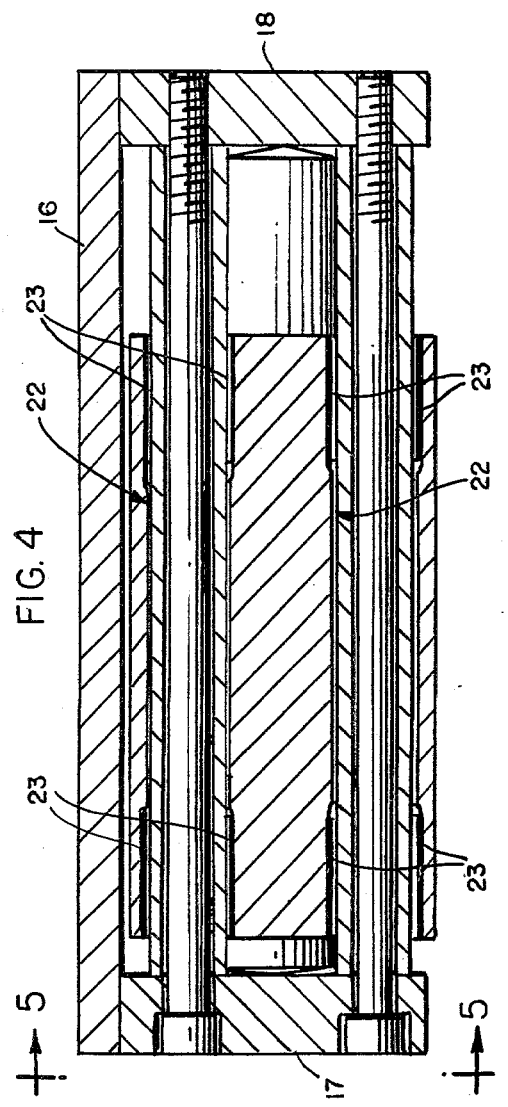
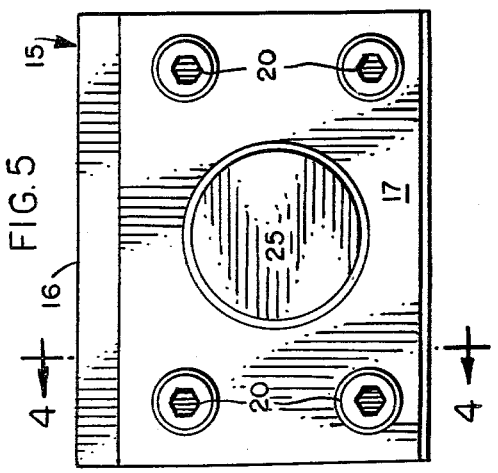

TOOL SLIDE APPARATUS

BACKGROUND

Various devices have heretofore been proposed for feeding a tool or other element as described, for example, in U.S. Pat. No. 3,994,539. Other patents of interest are U.S. Pat. Nos. 2,430,019; 2,659,348; 2,733,691 and 2,852,965.

Devices such as that shown in U.S. Pat. No. 3,994,539 are operated by and require the use of a high pressure external force.

It would be desirable and there is a need for a slide tool apparatus for feeding a tool or other element in one direction in a straight line at a controlled rate for a predetermined distance wherein the apparatus is compact and does not require the use of an external high pressure hydraulic supply but, on the contrary, can be actuated by the application of shop air pressure.

It is therefore an object of the present invention to provide such an apparatus as hereinafter described.

BRIEF SUMMARY OF THE INVENTION

A slide apparatus for feeding a tool or other element in one direction in a straight line at a controlled rate for a predetermined distance is provided characterized by a base having top, side, bottom and opposing end outer surfaces with tubular internal piston bores in opposing ends of said base, one bore being larger than the other, and each bore containing a sealed piston disposed for reciprocation, together with means for controlling the movement of said pistons by fluid pressure, and a frame having a top and opposing ends extending downwardly from said top, said frame adapted to carry a tool or other device to be fed, the opposing ends of said frame being rigidly connected by rods slidingly mounted in tubular passageways in said base and the inner sides of said ends of said frame being operably contacted by said pistons whereby said frame is moved in one direction in a straight line at a controlled rate in response to the movement of said pistons.

DETAILED DESCRIPTION OF THE INVENTION

The invention will be further illustrated but is not limited by the following description in conjunction with the accompanying drawings in which.

Figure 1:
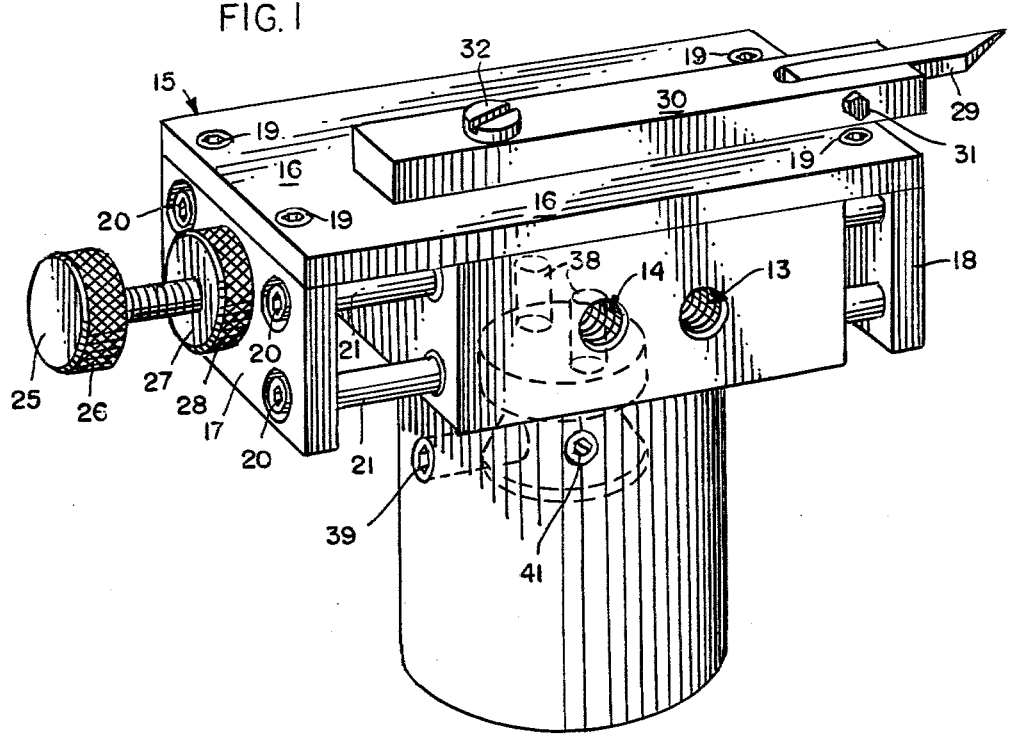
FIG. 1 is a perspective view of a tool slide apparatus containing a tool mounted thereon with the apparatus itself mounted on a fixed support.
Figure 6:
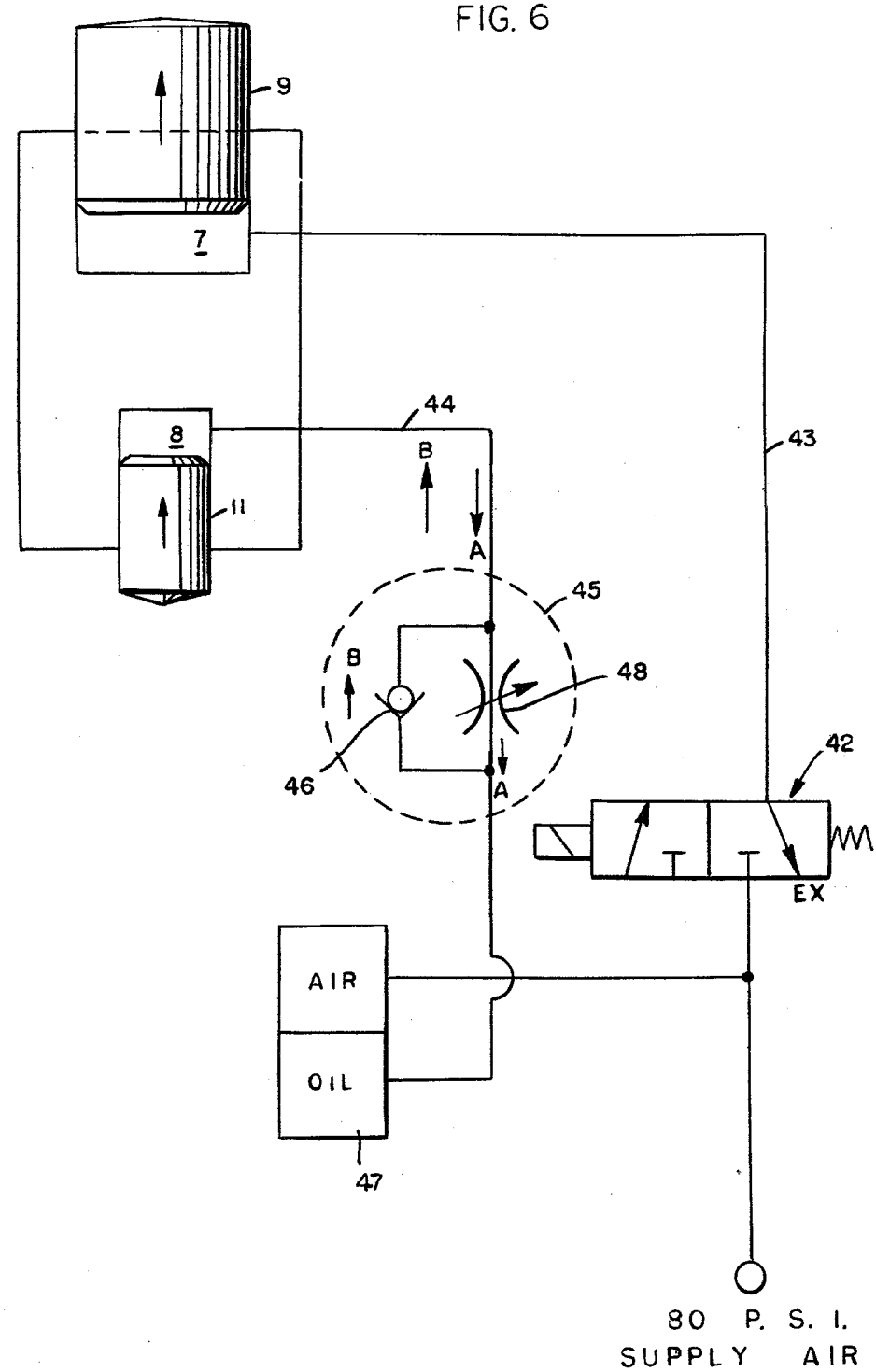

FIG. 3 is a cross sectional view of a portion of the apparatus shown in FIG. 1 illustrating the frame which is mounted on the base carrying an actuating stroke sealed piston disposed for reciprocation within a larger bore in said base and a stroke controlled sealed piston disposed for reciprocation within a smaller bore in said base; the movement of said stroke controlled sealed piston being limited by an adjusting screw;

FIG. 4 is a view, partly in section, taken along the line 4,4 of FIG. 5 illustrating the manner in which a tool carrying frame is mounted on the base;

FIG. 5 is an end view of the tool carrying frame taken along the line 5,5 of FIG. 4; and FIG. 6 is a diagrammatical view illustrating the means for controlling the actuating stroke sealed piston and the stroke controlled sealed piston.

Figure 2:
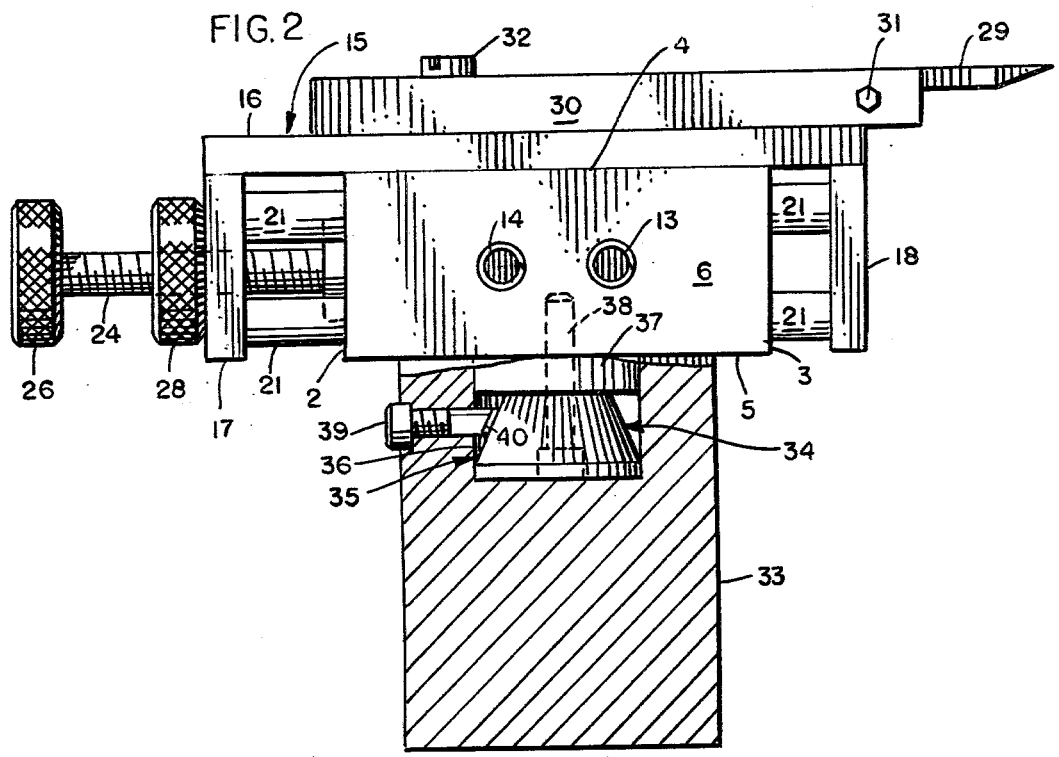
FIG. 2 is a side elevational view, partly in section, with parts broken away, of the apparatus shown in FIG. 1.

Referring to FIGS. 1, 2 and 3 of the drawings, the base 1 is made of metal or other suitable material and is generally rectangular in cross section with opposing ends 2 and 3, a top surface 4, a bottom surface 5, and opposing sides 6, only one of which is shown. The other opposing side 6 is the same as the side shown.

As shown in FIG. 3, the base 1 contains an internal bore 7 in one end thereof and another internal bore 8 in the opposite end, the internal bore 7 being adapted to receive an actuating stroke piston 9 sealed with respect to the internal surface of bore 7 by means of O-ring 10 and the internal bore 8 being adapted to receive a stroke control piston 11 sealed with respect to the internal surface of bore 8 by means of O-ring 12.

Piston 9 is actuated by fluid pressure introduced through bore 13 and piston 11 responds to fluid pressure in bore 14. The bores 13 and 14 are internally threaded and extend from side to side of sides 6 of base 1 in communication with piston bores 7 and 8, respectively. A source of fluid pressure as hereinafter described can be connected to either side 6 of base 1 and the unconnected side can be plugged by inserting a screw-type plug into the open ends of the bores.

A frame 15 comprising a top 16 and opposing ends 17 and 18 secured to said top by screws 19 is mounted on four rods 20, which are inserted into four tubes 21. End 18 of frame 15 is threaded to receive threaded ends of rods 20 after the latter have been inserted into the tubes 21. The ends of rods 20 at frame end 17 are recessed with polygonal sides adapted to receive a torque wrench so that the rods can be tightened and rigidly secured between frame ends 17 and 18.

The four tubes 21 are smooth surfaced and adapted to slide axially in four bores 22 (see FIG. 4) in base 1. The bores 22 are provided with bearing surfaces 23 to facilitate sliding movement of tubes 22.

An adjusting screw 24 is threadly mounted in ends 27 of frame 15 and turned by means of a member 25 having a knurled outer surface 26. Adjusting screw 24 is locked into a predetermined position by means of a nut 27 mounted thereon and having a knurled outer surface 28.

A tool 29 is mounted in a holding member 30 and held in place by a set screw 31. The holding member 30 is secured to the top 16 by means of a screw 32 as shown in FIGS. 1 and 2.

The tool slide apparatus previously described can be mounted from the bottom of base 1 in any suitable manner. A preferred mounting means as illustrated in FIGS. 1 and 2, comprises an external support 33 which is fixed or is part of a fixed object and contains a bore or cavity 34 in the upper central part thereof. The bore or cavity 34 is adapted to receive a member 35 which is generally circular in cross section and has frusto conical sides 36 extending upwardly to a circular flanged portion 37, the entire supporting assembly being secured to the lower side of base 1 by means of screws 38. A set screw 39 is threaded into the side of external support 33 and has a sloping inner surface 40 complemental to the frusto conical surface 36 whereby when set screw 39 is tightened the inner surface 30 exerts a wedging action against the frusto conical surface 36 which serves to hold the base 1 in a fixed position. When set screw 39 is loosened the entire tool slide assembly can be rotated with the base of the frusto conical member 35 supported by the bottom of cavity 34. A second set screw 41 can be mounted perpendicularly to set screw 39 in member 33 in order to increase the firmness of the mounting.

In the operation of the tool slide apparatus the adjusting screw 25 is adjusted to a predetermined position depending upon the length of travel desired for the frame member 15. The opening 13 is connected to a source of air supply as, for example, typical machine shop air pressure of 80 pounds per square inch (psi). Air is admitted through 3-way solenoid valve 42 and line 43 to piston bore 7, thereby actuating piston 9 and causing it in turn to contact the inner surface of end 18 of frame 15, thereby moving frame 15 and the tool mounted thereon in a straight line at a controlled rate until the inner end of stroke piston 11 contacts the inner end of bore 8. Bore 8 is connected by line 44 through opening 14 and a flow control valve 45 including a check valve 46 to an oil reservoir 47. The cross sectional ratio of actuating stroke piston 9 to stroke control piston 11 is 4:1 creating a pressure of 320 psi in line 44 and a pressure drop from 320 psi to 80 psi across flow control valve 45. This high pressure drop of 240 psi permits fine control on the forward stroke. The intensification of pressure avoids pressure fluctuation and also avoids erratic forward movement. In general, for the purpose of the invention, it is desirable that the ratio of the cross sectional area of the actuating stroke piston to the cross sectional area of the stroke control piston be within the range of 3:1 to 8:1. The stroke control piston preferably has a diameter of approximately one inch and the actuating stroke piston preferably has a diameter of $1\frac{7}{8}$ inches.

When the solenoid on valve 42 is energized, air flows through line 43 to bore 7, thereby forcing piston 9 in the direction of arrow. Movement of piston 9 causes movement of piston 11 in the same direction and distance. Piston 11 forces oil out of bore 8, through line 44, through the needle valve portion 48 of flow control valve 45, and into the pressurized reservoir 47.

When the solenoid on valve 42 is de-energized, line 43 is allowed to exhaust through the exhaust port on 3-way valve 42. Air from bore 7 is exhausted. Oil from reservoir 47 (still at 80 psi) flows unmetered through the check valve portion of valve 45, through line 44, and into bore 8, forcing piston 11 outwardly. This is the "return stroke" of the tool slide. It is relatively rapid since the oil does not flow through the needle valve but instead flows rapidly through the check valve 46. As shown in FIG. 6, the pressure is 320 psi when the flow is in direction A and 80 psi when the flow is in direction B.

The invention provides a new and unique method for accurate pin-point control of a rigidly mounted tool operable from a low pressure source of 80 psi normally available in most machine shops or readily made available.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A slide apparatus for feeding an element in one direction in a straight line at a controlled rate for a predetermined distance comprising, in combination:
   (a) a base having top, side, bottom and opposing end outer surfaces,
   (b) a tubular piston bore adapted to receive a piston in each of said opposing ends of said base of (a), said bores extending inwardly toward one another and terminating in closed inner ends within said base, one of said bores having a greater cross sectional area than the other,
   (c) an actuating stroke sealed piston disposed for reciprocation within said larger bore of (b),
   (d) a stroke control sealed piston disposed for reciprocation within said smaller bore of (b),
   (e) means for controlling the movement of said pistons of (c) and (d), said means comprising bores in said base of (a) connected to said bores of (b) adjacent their closed inner ends whereby fluids can be introduced into and withdrawn from said piston bores to actuate and control said pistons of (c) and (d),
   (f) a plurality of tubular passageways running axially from end to end of said base between the outer surfaces of said bores of (b) and the outer surfaces of said base,
   (g) a frame comprising a top and opposing ends extending downwardly from said top, said frame adapted to carry said element, and
   (h) rods rigidly connecting the ends of said frame of (g) so as to form a rigid frame structure, said rods each being slidingly mounted in said tubular passageways of (f) and the inner sides of said ends of said frame of (g) being operably contacted by said pistons of (c) and (d) whereby said frame slides and its movement is controlled by said pistons.

2. An apparatus as claimed in claim 1 comprising manually adjustable means for adjusting the stroke of said stroke control piston, said means comprising a threaded element mounted on said frame and operable to limit the stroke of said stroke control piston and consequently to limit the movement of said frame.

3. An apparatus as claimed in claim 2 comprising means to lock said threaded element in a predetermined position.

4. An apparatus as claimed in claim 1 wherein the ratio of the cross sectional area of the actuating stroke piston to that of the stroke control piston is within the range of 3:1 to 8:1.

5. An apparatus as claimed in claim 4 wherein the ratio is approximately 4:1.

6. An apparatus as claimed in claim 1 wherein fluids introduced and withdrawn through the control means for controlling the movement of the actuating stroke and stroke control pistons consists of air under pressure from an external source to control the movement of said actuating stroke piston and oil under pressure from an external source to control the movement of said stroke control piston.

7. An apparatus as claimed in claim 6 wherein said air under pressure is controlled by a 3-way valve and said oil under pressure is controlled by a needle valve and a check valve.

8. An apparatus as claimed in claim 1 in which said base is mounted on the top of a frusto-conical support the base of which is mounted for rotation in an exterior fixed support whereby said slide apparatus can be rotated horizontally to a predetermined position and retaining means operably associated with said frusto-conical support for said base and with said fixed support to retain said frusto-conical support for said base in a fixed predetermined position.

9. An apparatus as claimed in claim 8 in which said retaining means comprises a threaded member having a tapered inner end complemental to the angle of slope of said frusto-conical support so as to wedge said support downwardly when said threaded member is tightened against said frusto-conical support.

10. In a slide apparatus for feeding an element in one direction in a straight line at a controlled rate for a predetermined distance, a base for said apparatus mounted on a frustoconical support which in turn is mounted for rotation in a cavity in an exterior fixed support, said cavity having circular sides, whereby said slide apparatus can be rotated horizontally to a predetermined position and retaining means operably associated with said frusto-conical support for said base and with said fixed support to retain said frusto-conical support for said base in a fixed predetermined position.

11. An apparatus as claimed in claim 10 in which said retaining means comprises a threaded member having a tapered inner end complemental to the angle of slope of said frusto-conical support so as to wedge said support downwardly when said threaded member is tightened against said frusto-conical support.

* * * * *